United States Patent
Wu et al.

(10) Patent No.: US 6,504,502 B1
(45) Date of Patent: Jan. 7, 2003

(54) METHOD AND APPARATUS FOR SPACECRAFT ANTENNA BEAM POINTING CORRECTION

(75) Inventors: Yeong-Wei Wu, Rancho Palos Verdes, CA (US); Rongsheng Li, Hacienda Heights, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/479,702

(22) Filed: Jan. 7, 2000

(51) Int. Cl.$^7$ .............................................. H04B 7/185
(52) U.S. Cl. ...................... 342/354; 342/342; 342/359
(58) Field of Search ................................ 342/354, 359, 342/352

(56) References Cited

U.S. PATENT DOCUMENTS

| | | |
|---|---|---|
| 4,688,091 A | 8/1987 | Kamel et al. |
| 5,587,714 A | 12/1996 | Chu et al. |
| 5,852,792 A * | 12/1998 | Nielson ...................... 701/222 |
| 6,023,291 A * | 2/2000 | Kamel et al. ............... 348/147 |

OTHER PUBLICATIONS

Loh, Y.P. "On Antenna Pointing Control For Communications Satellite" (1992) GEC, AIAA–92–1940–CP, pp. 976–986.

* cited by examiner

Primary Examiner—Theodore M. Blum
(74) Attorney, Agent, or Firm—Gates & Cooper LLP (57) ABSTRACT

A pointing system and method for directing a first satellite system instrument to a first target is disclosed. The method comprises the steps of computing the orientation of a first satellite system instrument; computing a position of the satellite using measured orbital data; computing a target line of sight (LOS) vector direction from the satellite to the target using the computed orientation and the computed satellite position, and directing the first instrument to the first target according to the computed target LOS vector. The apparatus comprises at least one attitude sensor for the first instrument and a communicatively coupled satellite navigation system. The satellite navigation system determines the satellite position using measured satellite orbital data. The satellite navigation system computes the orientation of the first instrument using the attitude measurements, and computes the satellite position using measured satellite orbital data. The satellite navigation system also computes a target LOS vector direction from the satellite to the target using the computed orientation and the computed satellite position, and generates a first instrument orientation command from the computed target LOS vector direction. The orientation command is used by the first instrument to direct the instrument in the proper direction.

23 Claims, 7 Drawing Sheets

METHOD AND APPARATUS FOR SPACECRAFT ANTENNA BEAM POINTING CORRECTION

CROSS-REFERENCE TO RELATED APPLICATIONS

This application is related to the following co-pending and commonly assigned patent application, which application is hereby incorporated by reference herein:

Application Ser. No. 09/479,701, entitled "METHOD AND APPARATUS FOR SPACECRAFT PAYLOAD POINTING REGISTRATION," filed on Jan. 7, 2000, by Douglas H. Hein and Rongsheng Li, attorney's docket number PD-990107.

BACKGROUND OF THE INVENTION

1. Field of the Invention

The present invention relates to systems and methods of controlling instruments and other payloads mounted on satellites, and in particular to a method and system for directing a satellite downlink antenna using measured orbital ephemeris data such as satellite position and attitude.

2. Description of the Related Art

Figure 1:
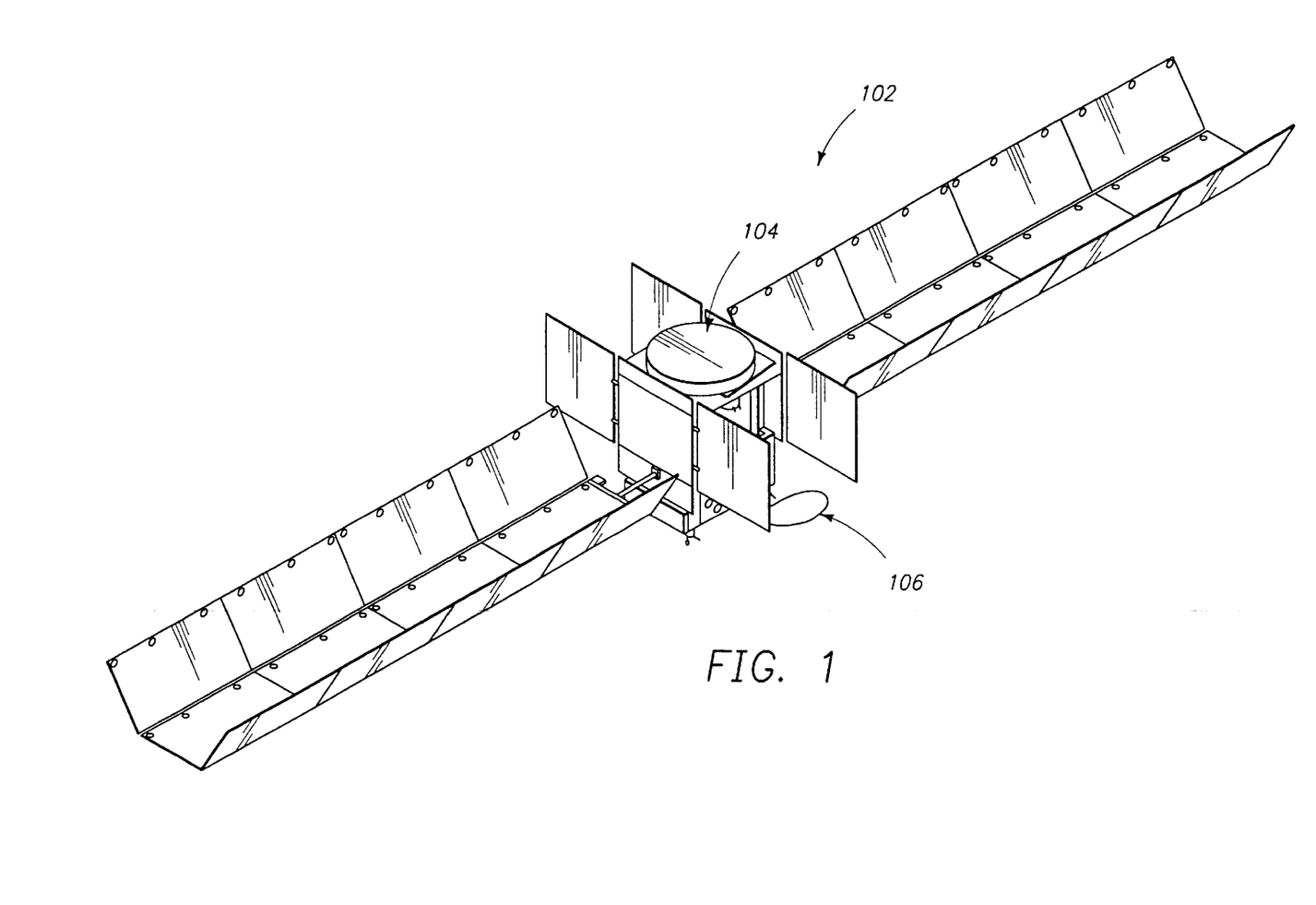
FIG. 1 is a diagram showing one embodiment of the satellite or spacecraft.

Satellites, particularly those in geosynchronous or geostationary orbits are an economical means for transmitting information over vast distances. FIG. 1 is a diagram of a typical communication satellite 102 includes a transmitting instrument 104 (such as the downlink phased array antenna) and a receiving instrument 106 (such as the uplink offset reflector antenna) for two-way communication. Typically, the satellite (or spacecraft's) 102 attitude is controlled to maintain the pointing for one of the instruments, usually the receiving instrument 106. In such cases, the transmitting instrument 104 will be subjected to a pointing error. This pointing error is caused by a number of factors, including: (1) errors induced by the spacecraft attitude control system (2) spacecraft orbit control errors, and (3) the offset steering of spacecraft attitude for maintaining the uplink antenna pointing. Spacecraft attitude control error is caused by torque disturbances acting on the spacecraft 102 and the finite bandwidth of attitude control system responding to the disturbance torque. Spacecraft orbit control error is caused by several sources, including the inaccuracy of thruster firing during station-keeping maneuvers and extrapolated errors between stationkeeping maneuvers. Offset spacecraft attitude steering is needed to compensate for uplink antenna pointing error caused by thermal distortion within the uplink antenna system itself If left uncorrected, the aforementioned error sources can result in transmitting instrument 104 pointing errors as large as 0.1 degree or more. An error correction system for a spacecraft antenna pointing to compensate for a transient perturbation in the attitude of the spacecraft is disclosed in Chu, et al, U.S. Pat. No. 5,587,714, which is hereby incorporated by reference herein. The Chu system provides for an improved pointing error, but compensates only one of the many instruments on the satellite (the uplink antenna) for spacecraft attitude control errors. Pointing correction for other instruments, including the downlink antenna, is not provided because of bus motion. Further, the correction supplied by the Chu reference results in potentially excessive angular pointing errors, because no provision is made for satellite orbital perturbations from an ideal orbit.

SUMMARY OF THE INVENTION

From the foregoing, it can be seen that there is a need for system and method providing computationally efficient and precise satellite instrument pointing correction. The present invention satisfies that need with a pointing system and method that uses the instrument (or payload) attitude and orbit data to generate error correction for the instrument. The downlink antenna pointing is thus described so that precision instrument pointing can be maintained subject to spacecraft control errors as well as offset steering of spacecraft attitude. The correction of downlink antenna pointing can be accomplished either mechanically in the case of a gimbaled antenna or electrically in the case of a phased way antenna.

The present invention discloses a method and apparatus for directing a first satellite system instrument to a first target. The method comprises the steps of computing the orientation of a first satellite system instrument; computing a position of the satellite using measured orbital data; computing a target line of sight (LOS) vector direction from the satellite to the target using the computed orientation and the computed satellite position, and directing the first instrument to the first target according to the computed target LOS vector.

One embodiment of the apparatus comprises at least one attitude sensor for the first instrument and a communicatively coupled satellite navigation system. The satellite navigation system determines the satellite position using measured satellite orbital data. The satellite navigation system computes the orientation of the first instrument using the attitude measurements, and computes the satellite position using measured satellite orbital data. The satellite navigation system also computes a target LOS vector direction from the satellite to the target using the computed orientation and the computed satellite position, and generates a first instrument orientation command from the computed target LOS vector direction. The orientation command is used by the first instrument to direct the instrument in the proper direction.

Another embodiment of the apparatus comprises a first instrument attitude sensor communicatively coupled a first processor and a second processor. The first processor computes an attitude of the first instrument and an ephemeris for an orbit of the satellite. The first processor also uses these computed values to generate the first instrument attitude error estimate and an orbital error estimate. The second processor computes a first instrument pointing error correction using the first instrument attitude error estimate and the orbital error estimate.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 2:
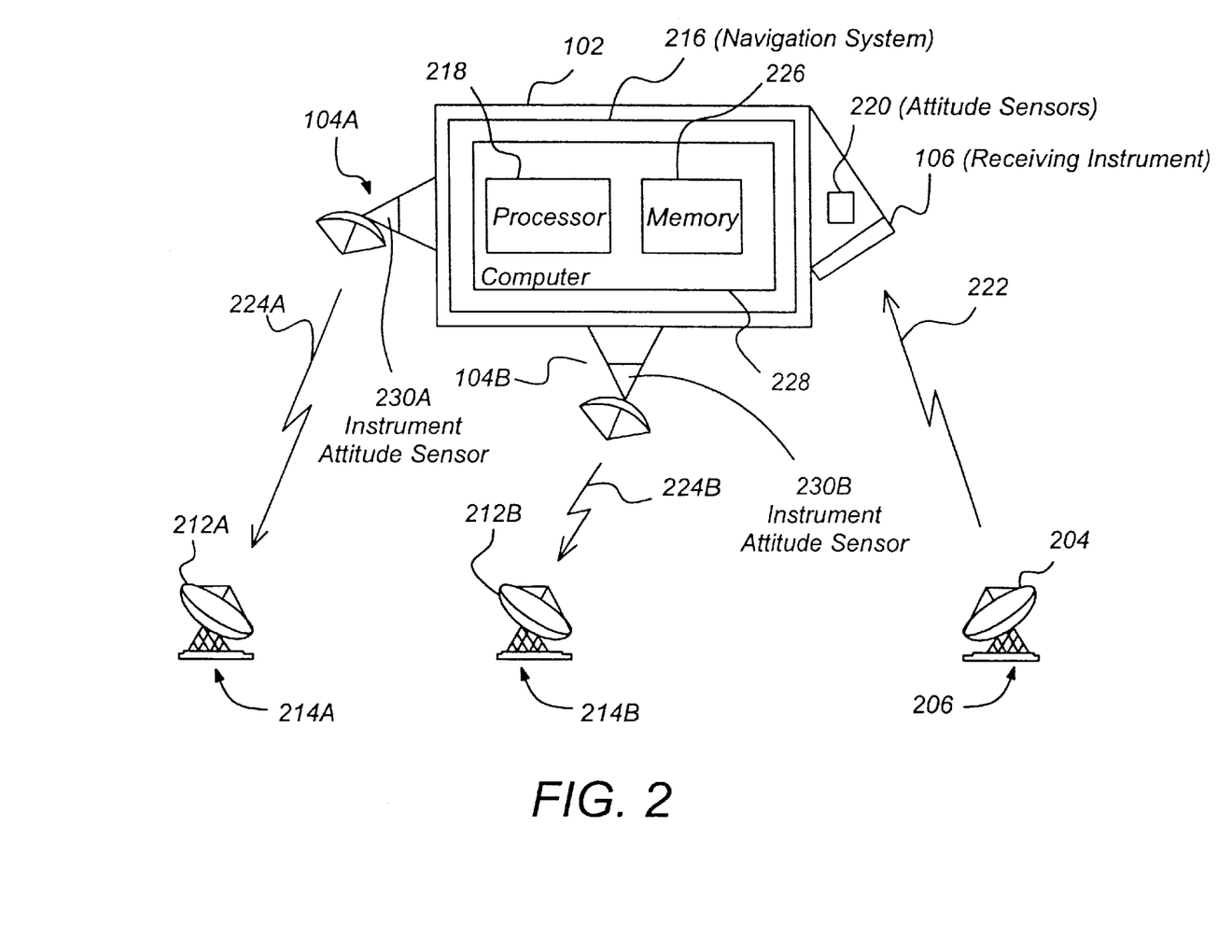
FIG. 2 is a diagram showing the relevant geometry and vectors for a geostationary satellite.

FIG. 2 is a diagram illustrating the operation of a communications satellite 102. The satellite 102 accepts uplink 222 information from a beacon station 204 at an uplink location 206 via a receiving instrument 106. This information is processed, if necessary, and transmitted via transmitting instruments 104A and 104B (hereinafter collectively referred to as transmitting instrument(s) 104, and downlinks 224A and 224B (collectively referred to hereinafter as downlink(s) 224) to one or more ground targets 212A and 212B (collectively referred to hereinafter as ground link(s) 212) disposed at downlink locations 214A and 214B, respectively (hereinafter collectively referred to as downlink location(s) 214).

The satellite 102 also comprises a navigation system 216 to control the satellite 102 body attitude and to perform necessary maneuvers for stationkeeping and other satellite functions. The navigation system typically includes one or more computers 228, each having or more processors 218 communicatively coupled to one or more memories 226.

Generally, the computer 228 operates under control of an operating system stored in the memory 226, and accepts inputs and commands and to perform satellite 102 functions. The operating system and the computer program are comprised of instructions which, when read and executed by the computer 228, causes the computer 228 to perform the steps necessary to implement and/or use the present invention. Computer program and/or operating instructions may also be tangibly embodied in memory 226 and/or data communications devices, thereby making a computer program product or article of manufacture according to the invention. As such, the terms "article of manufacture," "program storage device," and "computer program product" as used herein are intended to encompass a computer program accessible from any computer readable device or media.

Figure 3:
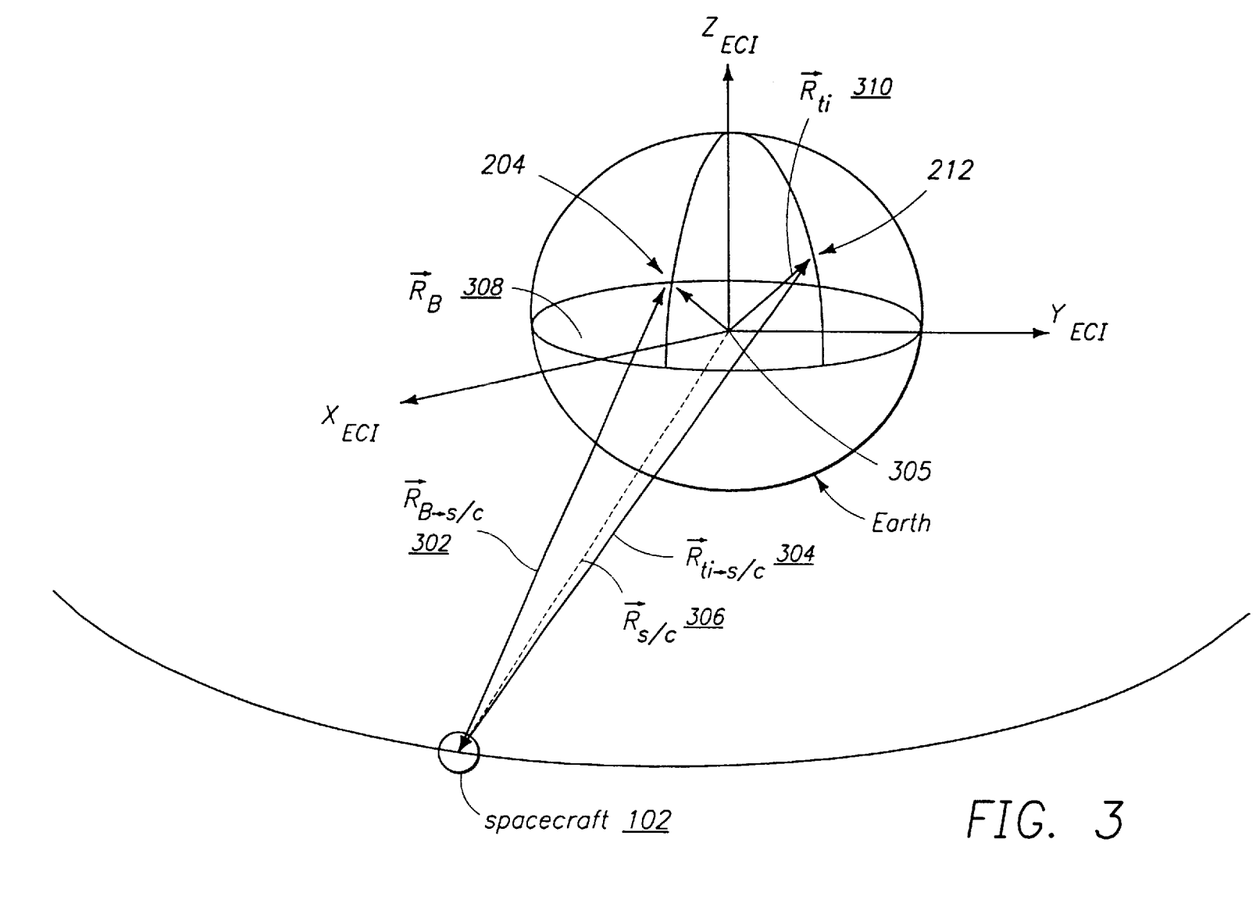
FIG. 3 is a diagram showing the pointing geometry for a geostationary satellite with a ground beacon station providing an uplink beam for uplink beacon pointing control.

FIG. 3 is a diagram showing the pointing geometry for a geostationary satellite 102 with a ground beacon station 204 providing an uplink 222 beam. The satellite 102 implements an uplink 222 beacon track system is implemented to control the spacecraft 102 body attitude so that the receiving instrument 106 (e.g. uplink antenna) pointing can be maintained. To maintain the receiving instrument 106 pointing, the spacecraft 102 attitude needs to be steered off its normal pointing to compensate for: (1) attitude error caused by receiving instrument thermal/structure deformation, and (2) attitude error caused by imperfection of spacecraft attitude and orbit controls. As a result of spacecraft 102 motion to maintain the uplink antenna pointing, the pointing error of the transmitting instrument 104 (e.g. downlink antenna) can be as large as 0.1 degree.

The present invention provides a system and method for a real-time computation of pointing commands used to control a desired pointing for the transmitting instrument 104 subject to spacecraft 102 offset steering as well as spacecraft attitude and orbit control errors.

The geometry shown in FIG. 3 describes a boresight vector 302 from the spacecraft 102 to the beacon station 204, which is denoted hereinafter as $\vec{R}_{b \rightarrow s/c}$, and a target vector 304, which is denoted hereinafter as $\vec{R}_{t \rightarrow s/c}$. Although we assume that the transmitting instrument's boresight vector 302 coincides with the beacon station 204 used for receiving instrument pointing control, it can be pointed to any other location on the earth's surface, such as the nadir point. Hence, the description which follows is applicable to a more general case where the transmitting instrument boresight points to a known ground location. Since the present invention is especially suitable for pointing a plurality of instruments at a variety of downlink locations 214, there may be a plurality of target vectors. Each of these target vectors can be described as $\vec{R}_{ti \rightarrow s/c}$ 304 wherein i=1, 2, 3 . . . n, and n is the number of different instruments. Vector $\vec{R}_{s/c}$ 306 is defined from the center of the earth 305 to the satellite 102. Further, vector $\vec{R}_B$ 308 is defined between the center of the earth 305 and the beacon station, and vector $\vec{R}_{ti}$ 310 is a vector from the center of the earth to the ground target 212.

Figure 4:
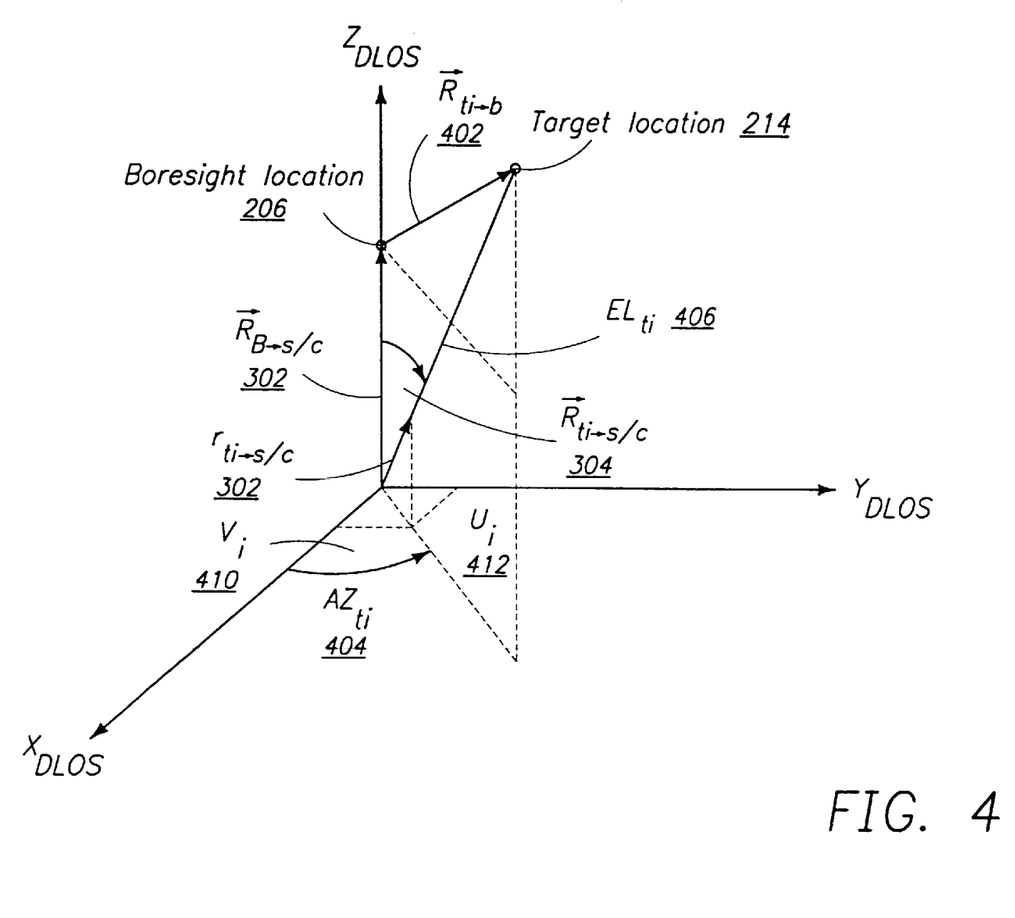
FIG. 4 is a diagram presenting a vector geometry in a satellite-based downlink line of sight reference frame.

FIG. 4 is a diagram presenting the foregoing vector geometry in a satellite-based downlink line of sight (DLOS) reference frame. The target vector $\vec{R}_{t \rightarrow s/c}$ can be described in terms of an azimuth angle $AZ_{ti}$ 404 from the boresight location 206 to the target location 214 and an elevation angle $EL_{ti}$ from the boresight location 206 to the target location 214 in satellite-centered angular LOS coordinates.

Figure 5:
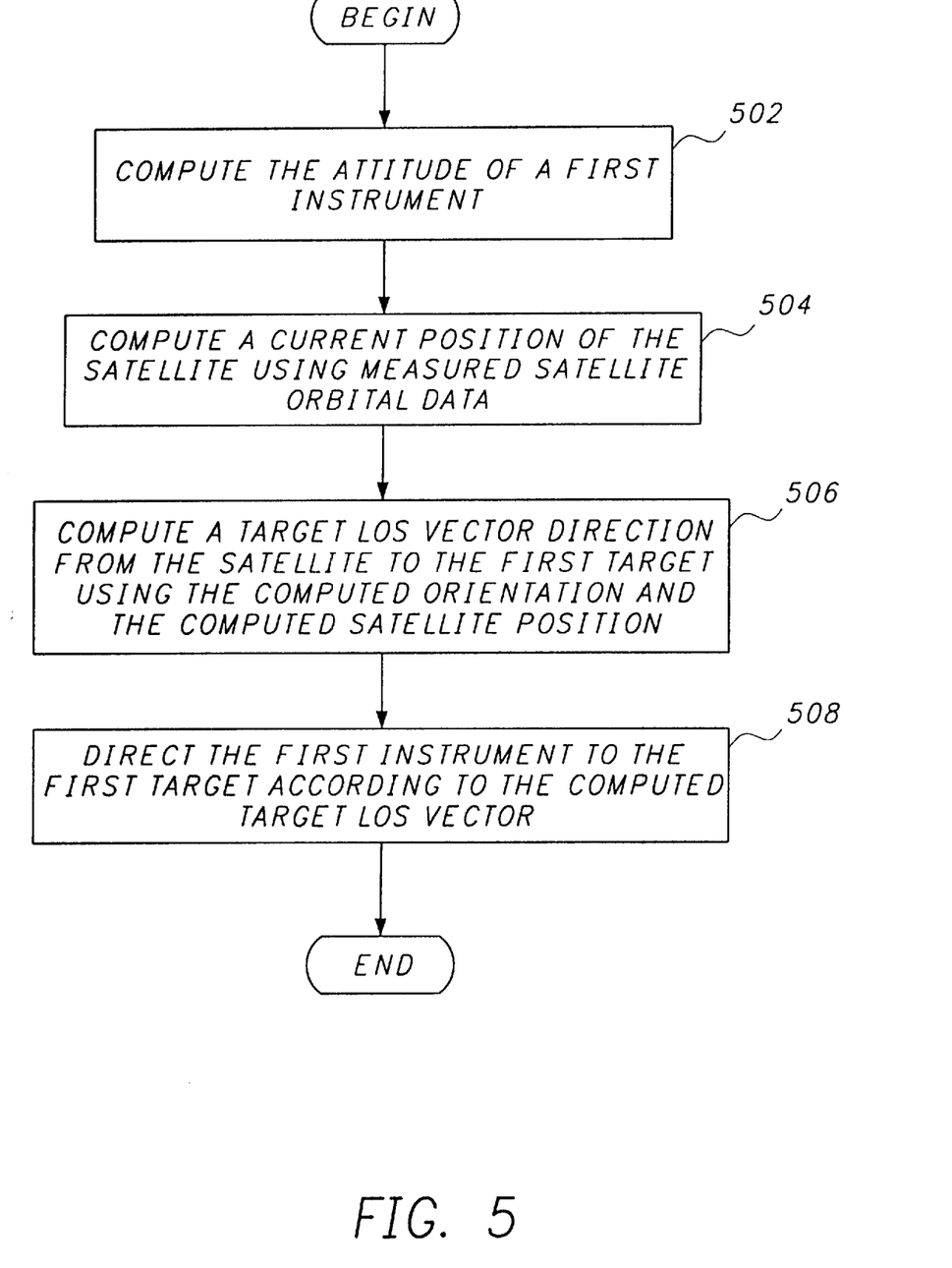
FIG. 5 is a flow chart presenting exemplary process steps used to practice one embodiment of the present invention.

FIG. 5 is a flow diagram presenting exemplary process steps used to practice one embodiment of the present invention. An attitude of the first instrument (such as the transmitting instrument 104A) is computed, as shown in block 502. In one embodiment, the attitude of the first instrument is used to generate a three axis attitude of the first instrument LOS with respect to an earth-fixed (EF) inertial reference frame, and is expressed as a direction cosine matrix $C_{DLOS-EF}$, which transforms reference frames from the DLOS reference frame to the EF reference frame.

In cases where the attitude of the first instrument is fixed with respect to the remainder of the satellite 102 body, this can be determined with the satellite navigation system 216 from the spacecraft attitude and appropriate transformations to the first instrument's reference frame. Where the first instrument itself is a steerable instrument, the orientation can be determined from the steering commands provided to the first instrument, or by one or more first instrument attitude sensors 230A, 230B. In another embodiment, the orientation of the first instrument can be determined by beacon track sensors.

The current position of the satellite 102 is computed using measured satellite 102 orbital data, as shown in block 504. This value can be expressed as $\vec{R}_{s/c}^{EF}$. In one embodiment of the present invention, the current position of the satellite 102 is determined from an ephemeris generation algorithm computed in the satellite by the satellite navigation system 216 and its associated navigation sensors (which may include, for example, one or more star sensors, sun sensors, earth limb sensors, an inertial reference unit or other combination of gyros and accelerometers). In another embodiment of the present invention, the on-board computed satellite position is augmented or supplanted by ground-based measurements and computations, and transmitted to the satellite 102 from time to time.

Next, as shown in block 506, a target LOS vector 304 is computed from the satellite to the target using the computed orientation (e.g. the $C_{DLOS-EF}$ matrix), the computed satellite 102 position, and the location of the first target 214. If there are multiple targets, this is performed for each target. In one embodiment, this is performed by computing the following:

$$\vec{R}_{ti \rightarrow s/c} = [C_{DLOS-EF}](\vec{R}_{ti}^{EF} - \vec{R}_{s/c}^{EF}) \qquad (1)$$

with $$\vec{R}_{ti}^{EF} = \begin{bmatrix} R_{rsq} * r_{ti} * \cos(lat_{ti}) * \cos(lon_{ti}) \\ R_{rsq} * r_{ti} * \cos(lat_{ti}) * \sin(lon_{ti}) \\ r_{ti} * \sin(lat_{ti}) \end{bmatrix} \quad (2)$$

$$r_{ti} = \frac{R_p}{\sqrt{1 + f * \cos^2(lat_{ti})}} \quad (3)$$

$$\vec{r}_{ti \to \frac{s}{c}} = \begin{bmatrix} u_{ti} \\ v_{ti} \\ w_{ti} \end{bmatrix} = \frac{\vec{R}_{ti \to \frac{s}{c}}}{|\vec{R}_{ti \to \frac{s}{c}}|} \quad (4)$$

wherein $$R_{rsq} = \left(\frac{R_e}{R_p}\right)^2,$$

$R_e$=Earth radius at the Equator ⌀ 6,378.245 km, $R_p$=Earth radius at poles ⌀ 6,359.856 km, $f=(R_{rsq}-1)$ and $lon_{ti}$ and $lat_{ti}$ are the ground target's 212 known geodetic longitude and latitude.

As shown in block 508 of FIG. 5, the first instrument (e.g. the transmitting instrument 104) is directed to the first target (e.g. the ground target 212) according to the computed target line of sight vector direction given by equation (4). In one embodiment of the present invention, the first instrument is a gimbaled transmitting instrument 104. In this embodiment, the transmitting instrument 104 is physically slewed to the proper orientation. In another embodiment of the present invention, the transmitting instrument is a phased array antenna, which allows electrical beam steering. In this case, the transmitting instrument 104 is directed by appropriate commands to the elements of the phased array antenna.

Figure 6:
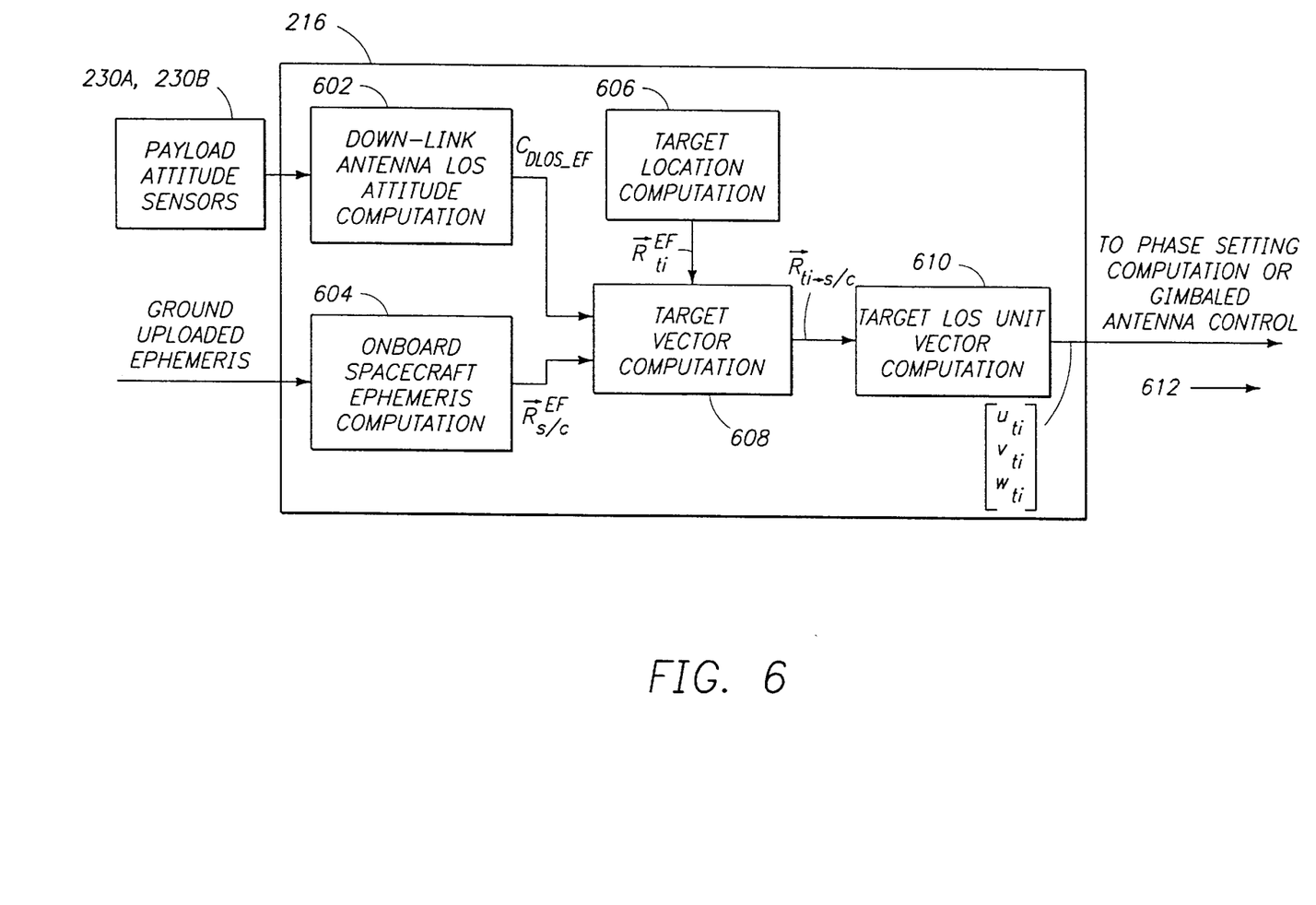
FIG. 6 is a block diagram presenting an exemplary embodiment one possible apparatus for practicing the present invention.

FIG. 6 is a block diagram presenting an exemplary embodiment of the satellite navigation system 216, which can be used to perform the foregoing operations. Attitude sensors 230A, 230B provide first instrument attitude information to the satellite navigation system 216. The satellite navigation system 216 comprises a first module 602 that computes the attitude of the first instrument in terms of the direction cosine matrix $C_{DLOS-EF}$. The satellite navigation system 216 also comprises a second module 604 that determines the ephemeris of the satellite 102. If necessary ground updates are provided to increase the accuracy of the ephemeris determination. The ephemeris computation is used to determine the position of the spacecraft in the earth fixed coordinate frame $\vec{R}_{s/c}^{EF}$. Similarly, the target location computation module 606 is used to compute the position of the target to be pointed in the earth fixed coordinate reference frame $\vec{R}_{ti}^{EF}$. Finally, a fourth module 608 computes the target vector $\vec{R}_{t \to s/c}$ 304 using the direction cosine matrix $C_{DLOS-EF}$, the position of the spacecraft $\vec{R}_{s/c}^{EF}$, and the position of the target $\vec{R}_{ti}^{EF}$. The target vector $\vec{R}_{t \to s/c}$ 304 is then provided to a fifth module 610, which computes the target LOS unit vector $r_{ti \to s/c}$ 408 according to equation (4). These values are then supplied to an instrument interface 612 to a gimbaled instrument or to the phase settings used for a phased array instrument 104.

Figure 7:
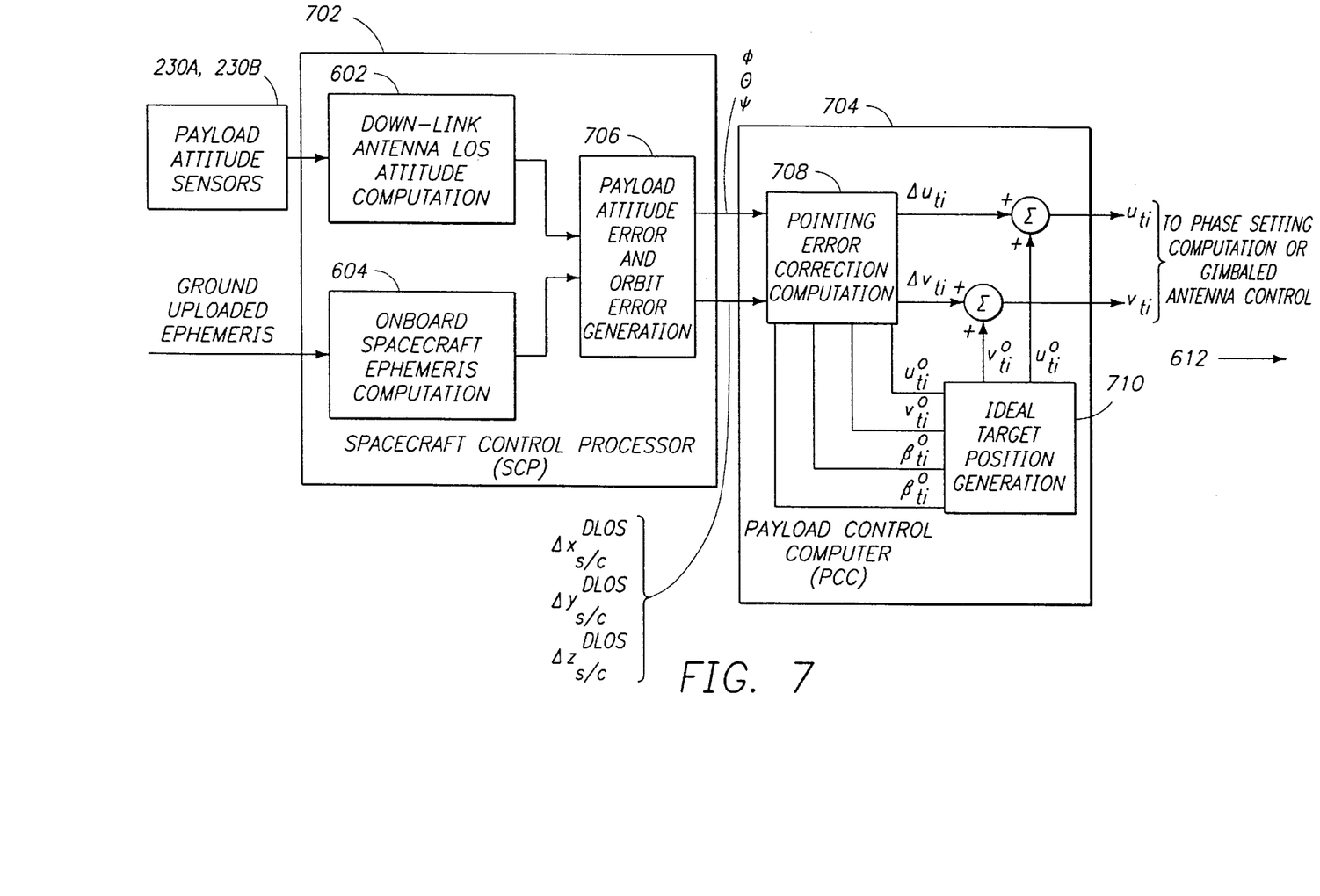
FIG. 7 is a block diagram presenting an alternative embodiment of the present invention.

FIG. 7 is a block diagram illustrating further embodiment of the present invention. In the embodiments described thus far, the data from the attitude sensors 220 and the ephemeris information was used to compute the first instrument attitude commands. In the embodiment depicted in FIG. 7, however, the same data is used to generate an error signal that is used to modify idealized first instrument attitude commands to compensate for payload attitude and orbital errors.

The attitude sensors 230A, 230B provide first instrument attitude information to a spacecraft control processor in the navigation system 216. A first module 602 computes the attitude of the first instrument, and a second module 604 determines the position of the satellite 102. These values are provided to an instrument attitude error and orbit error generator 706. The attitude error can be expressed as φ and θ, and ψ wherein φ and θ, and ψ are the first instrument roll, pitch, and yaw attitude errors. The orbital error can be expressed as the vector:

$$\begin{bmatrix} \Delta x_{s/c}^{DLOS} \\ \Delta y_{s/c}^{DLOS} \\ \Delta z_{s/c}^{DLOS} \end{bmatrix} = [\tilde{C}_{LOS\_O}] \cdot \begin{bmatrix} \Delta x_{s/c} \\ \Delta y_{s/c} \\ \Delta z_{s/c} \end{bmatrix} \quad (5)$$

The generated instrument attitude error and orbit errors are provided to a payload a pointing error correction module 708 in a payload control computer (PCC) or similar processor. The PCC 704 uses this information, along with information from the ideal target position generator 710 to generate incremental unit vector commands $\Delta u_{ti}$ and $\Delta v_{ti}$, which are defined as follows:

$$\Delta u_{ti} = \theta - v_{ti}^0 \psi - u_{ti}^0 \beta_{ti}^0 \Delta z_{s/c}^{DLOS} - (\beta_b^0 - \beta_{ti}^0) \Delta x_{s/c}^{DLOS} \quad (6)$$

$$\Delta v_{ti} = -\phi - u_{ti}^0 \psi - v_{ti}^0 \beta_{ti}^0 \Delta z_{s/c}^{DLOS} - (\beta_b^0 - \beta_{ti}^0) \Delta y_{s/c}^{DLOS} \quad (7)$$

wherein $$\beta_{ti}^0 = \frac{1}{|\vec{R}_{ti \to s/c}^0|} \quad (8)$$

and $$\beta_b^0 = \frac{1}{|\vec{R}_{b \to s/c}^0|} \quad (9)$$

wherein $|\vec{R}_{ti \to s/c}^0|$ is the idealized target range (i.e. the distance between the target position and the spacecraft position), and $|\vec{R}_{b \to s/c}^0|$ is the idealized boresight range (distance between the boresight location and the spacecraft location).

The incremental unit vector commands $\Delta u_{ti}$ and $\Delta v_{ti}$ are added to the idealized unit vectors $u_{ti}^0$ and $v_{ti}^0$ to correct the idealized target position unit vectors $u_{ti}^0$ and $v_{ti}^0$ for the payload attitude and spacecraft position-induced errors, producing unit vector commands $u_{ti}$ and $v_{ti}$.

CONCLUSION

This concludes the description of the preferred embodiments of the present invention. In summary, the present invention describes a pointing system and method for directing a first satellite system instrument to a first target. The method comprises the steps of computing the orientation of a first satellite system instrument; computing a position of the satellite using measured orbital data; computing a target line of sight (LOS) vector direction from the satellite to the target using the computed orientation and the computed satellite position, and directing the first instrument to the first target according to the computed target LOS vector. The apparatus comprises at least one attitude sensor for the first instrument and a communicatively coupled satellite navigation system. The satellite navigation system determines the satellite position using measured satellite orbital data. The satellite navigation system computes the orientation of the first instrument using the attitude measurements, and computes the satellite position using measured satellite orbital data. The satellite navigation system also computes a target LOS vector direction from the satellite to the target using the computed orientation and the computed satellite position, and generates a first instrument orientation command from the computed target LOS vector direction. The orientation command is used by the first instrument to direct the instrument in the proper direction.

Another embodiment of the apparatus comprises a first instrument attitude sensor communicatively coupled a first processor and a second processor. The first processor computes an attitude of a line of sight of the first instrument and an ephemeris for an orbit of the satellite. The first processor also uses these computed values to generate a first instrument pointing error estimate and an orbital error estimate. The second processor computes a first instrument pointing error correction using the first instrument error estimate and the orbital error estimate. For example, although the foregoing has been described with respect to the use of receiving and transmitting instruments, the scope of this invention is not limited thereto. The first and second instruments described above can include a wide variety of instruments. For example, both the first and second instruments may be receive antennae, or both may be transmit antennae. The instruments may also include optical measurement or communication instruments as well. Further, while the invention has been described primarily with respect to the pointing of a single instrument, the foregoing can also be applied without loss of generality to include the control of several instruments, all directed to one or more different places on the Earth's surface.

Therefore, it is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of directing first instrument disposed on a satellite to a first target comprising the steps of:
   computing an attitude of a first instrument;
   computing a position of the satellite using measured satellite orbital data;
   computing a target line of sight (LOS) vector direction from the satellite to the first target using the computed attitude and the computed satellite position; and
   directing the first instrument to the first target according to the computed target LOS vector direction.

2. The method of claim 1, wherein the step of computing the satellite position using measured satellite orbital data comprises the step of computing an ephemeris for the satellite.

3. The method of claim 2, wherein the ephemeris is computed in the satellite.

4. The method of claim 2, wherein the ephemeris is computed at a ground station and transmitted to the satellite.

5. The method of claim 1, wherein the first instrument is a downlink antenna and he method further comprises the step of directing an uplink antenna at a second target when directing the downlink antenna at the first target.

6. The method of claim 1, wherein the step of computing an orientation of the first instrument comprises the step of:
   measuring the attitude of the first instrument using at least one attitude sensor; and
   computing the orientation of the first instrument using the attitude sensor measurements.

7. The method of claim 6, wherein the step of computing the orientation of the first instrument using the attitude sensor measurements comprises the step of computing a direction cosine matrix from the attitude sensor measurements.

8. The method of claim 1, wherein the step of computing a target LOS vector direction from the satellite to the target using the computed orientation and the computed satellite position comprises the steps of:
   computing a boresight vector using the computed orientation of the first instrument, the computed satellite position, and a location of the first target;
   computing a target LOS vector from the satellite to the target using the computed orientation of the first instrument, the computed satellite position, and a location of the first target; and
   computing the target LOS vector direction from the computed boresight vector and the computed target LOS vector.

9. An apparatus for directing a first instrument disposed on a satellite to a first location, comprising:
   at least one sensor for measuring an attitude of a first instrument on the satellite;
   a satellite navigation system for determining the satellite position using measured satellite orbital data, the satellite navigation system comprising a processor communicatively coupled to the sensor, for computing the orientation of the first instrument using the attitude measurements, for computing the satellite position using measured satellite orbital data, and for computing a target line of sight (LOS) vector direction from the satellite to the first location using the computed orientation and the computed satellite position, and for generating a first instrument orientation command from the computed target (LOS) vector direction; and
   a first instrument interface, for receiving the first instrument orientation command to direct the first instrument.

10. The apparatus of claim 9, wherein the first instrument is a downlink antenna.

11. The apparatus of claim 9, wherein the satellite navigation system determines the satellite position from the ephemeris of the satellite orbit.

12. The apparatus of claim 9, wherein the satellite navigation system receives the ephemeris of the satellite orbit from a ground station.

13. The apparatus of claim 12, wherein the satellite navigation system receives updates of the ephemeris of the satellite orbit from the ground station.

14. An apparatus for directing a first instrument disposed on a satellite to a first location, comprising:
   at least one first instrument attitude sensor;
   a first processor, communicatively coupled to the first instrument attitude sensor, for computing an attitude of a line of sight (LOS) of the first instrument, for computing an ephemeris for an orbit of the satellite and for computing a first instrument pointing error estimate and an orbital error estimate using the computed ephemeris and the computed attitude of the first instrument; and a second processor, coupled to the first processor for computing a first instrument pointing error correction using the computed second instrument pointing error estimate and the computed orbit error estimate.

15. An apparatus for directing a first instrument disposed on a satellite to a first target comprising:

means for computing the orientation of a first instrument in a first reference frame;

means for computing a position of the satellite in the first reference frame using measured satellite orbital data;

means for computing a target line of sight (LOS) vector direction from the satellite to the first target using the computed orientation and the computed satellite position in a second reference frame; and means for directing the first instrument to the first target according to the computed target LOS vector.

16. The apparatus of claim 15, wherein the means for computing the satellite position using measured satellite orbital data comprises means for computing an ephemeris for the satellite.

17. The apparatus of claim 16, wherein the ephemeris is computed in the satellite.

18. The apparatus of claim 16, wherein the ephemeris is computed at a ground station and transmitted to the satellite.

19. The apparats of claim 15, wherein the first instrument is an uplink antenna, and the apparatus further comprises means for directing an uplink antenna at a second target while directing the downlink antenna at the first target.

20. The apparatus of claim 15, wherein the means for computing an orientation of the second instrument comprises:

means for measuring the attitude of the first instrument using attitude sensors; and means for computing the orientation of the first instrument using the attitude sensor measurements.

21. The apparatus of claim 20, wherein the means for computing the orientation of the first instrument using the attitude sensor measurements comprises means for computing a direction cosine matrix from the attitude sensor measurements.

22. The apparatus of claim 15, wherein the means for computing a target LOS vector direction from the satellite to the first target using the computed orientation and the computed satellite position comprises:

means for computing a boresight vector in the first reference frame using the computed orientation of the second satellite system instrument, the computed satellite position, and a location of the first target;

means for computing a target LOS vector from the satellite to the target using the computed orientation of the first instrument, the computed satellite position, and location of the first target; and means for computing the target LOS vector direction from the computed boresight vector and the computed target LOS vector.

23. A program storage device, readable by a computer, tangibly embodying at least one program of instructions executable by the computer to perform method steps of directing a first instrument disposed on a satellite to a first target, the method steps comprising the steps of:

computing the orientation of a first instrument;

computing a position of the satellite using measured satellite orbital data;

computing a target line of sight (LOS) vector direction from the satellite to the first target using the computed orientation and the computed satellite position; and directing the first instrument to the first target according to the computed target LOS vector direction.

\* \* \* \* \*